United States Patent [19]

Davis et al.

[11] 4,429,333
[45] Jan. 31, 1984

[54] DOCUMENT SCANNING SYSTEM

[75] Inventors: James W. Davis, Richardson; Dale R. DuVall, Keller; Barry C. Kockler, Lewisville, all of Tex.

[73] Assignee: The Mead Corporation, Dayton, Ohio

[21] Appl. No.: 355,826

[22] Filed: Mar. 8, 1982

[51] Int. Cl.³ .............................................. H04N 1/10
[52] U.S. Cl. ....................................... 358/293; 355/23
[58] Field of Search .................... 355/23, 25; 358/293, 358/285, 289

[56] References Cited

U.S. PATENT DOCUMENTS

| | | | |
|---|---|---|---|
| 3,227,444 | 1/1966 | Egan | 355/23 |
| 3,302,519 | 2/1967 | Young | 88/24 |
| 3,844,653 | 10/1974 | Kelly | 355/8 |
| 3,844,654 | 10/1974 | Guenther | 355/24 |
| 4,043,550 | 8/1977 | Phillips et al. | 271/233 |
| 4,043,665 | 8/1977 | Caldwell | 355/76 |
| 4,110,030 | 8/1978 | Knechtel | 355/11 |
| 4,115,103 | 5/1979 | Gamblin et al. | 358/296 |
| 4,158,497 | 6/1979 | Suzuki et al. | 355/8 |
| 4,178,093 | 11/1979 | Yanagawa et al. | 355/8 |
| 4,205,350 | 5/1980 | Gunning | 358/296 |
| 4,247,192 | 1/1981 | Komori et al. | 355/23 |
| 4,258,395 | 3/1981 | Nodov | 358/293 |

FOREIGN PATENT DOCUMENTS 1531401 11/1978 United Kingdom .

OTHER PUBLICATIONS

Potak-IBM Technical Disclosure Bulletin vol. 17, No. 12, May, 1975.

*Primary Examiner*—John C. Martin
*Assistant Examiner*—Edward L. Coles
*Attorney, Agent, or Firm*—Biebel, French & Nauman

[57] ABSTRACT

A document scanning system having a platen for scanning bulky documents and two separate exposing stations for front and reverse side scanning of automatically fed sheet-type original documents. The platen and the two exposing stations are arranged in a common plane for scanning by scanning elements carried on a linearly driven carriage. Image sensing is performed by CCD arrays mounted on the scanner carriage. Scanning at the two exposing stations is conducted with the scanner carriage stationary, while platen scanning proceeds with the scanner carriage moving linearly at a uniform speed.

10 Claims, 12 Drawing Figures

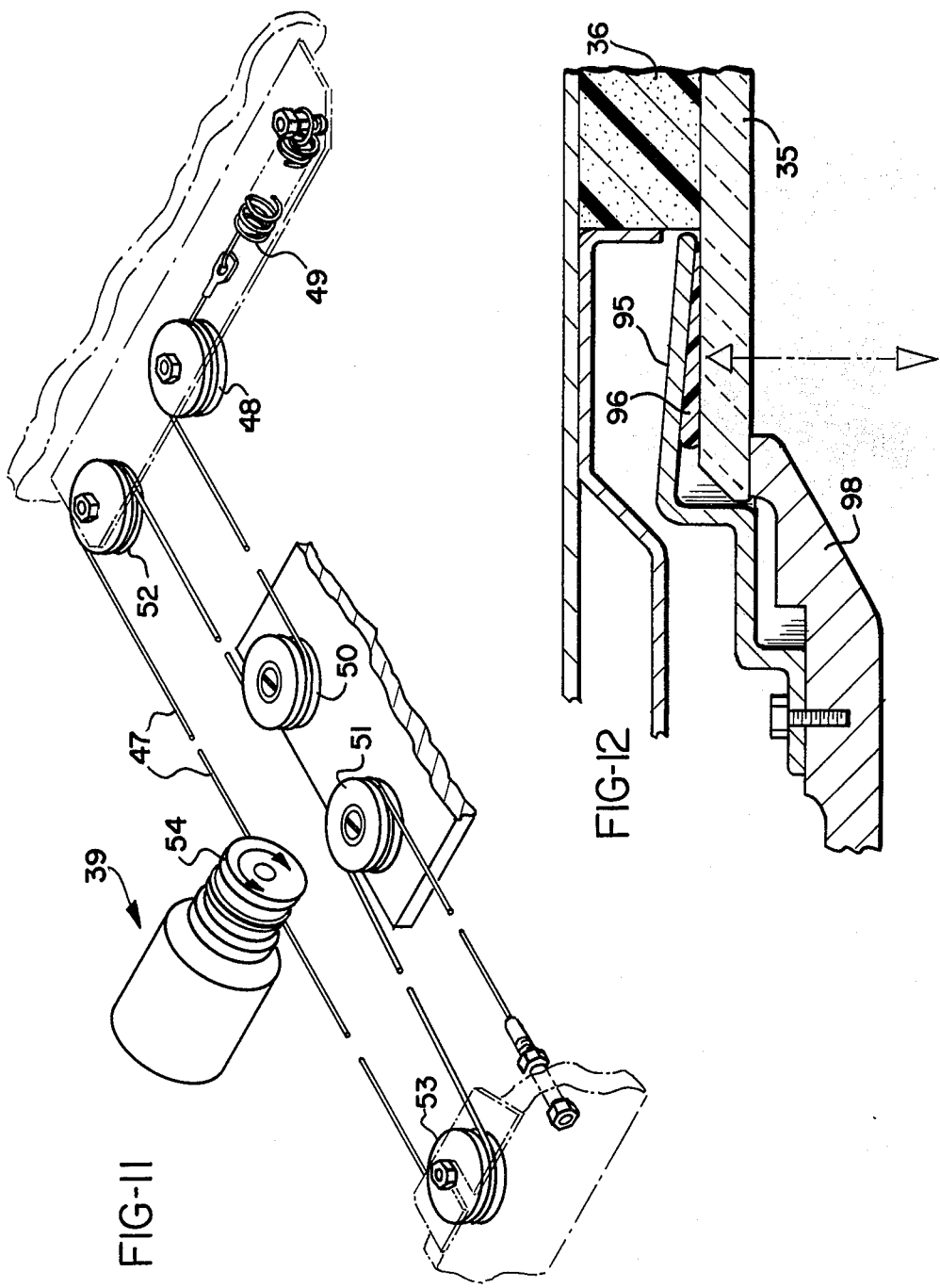

DOCUMENT SCANNING SYSTEM

BACKGROUND OF THE INVENTION

This invention relates to a document scanning system for use with a copier or a duplicator. More particularly, the invention relates to a document scanning system for scanning original documents which may be in the form of either individual sheets or bound volumes and generating corresponding scanning signals suitable for loading into a memory. Once loaded into memory, the scanned information may be used for controlling the operation of a dot matrix printing device, such as an ink jet printer. Typical ink jet printers which might be used for such a purpose are disclosed in Frey U.S. Pat. No. 4,010,477, Paranjpe U.S. Pat. No. 4,085,409, and in Vedder U.S. Pat. No. 4,234,884.

Typical prior art scanners for use in ink jet copying are shown in Nodov U.S. Pat. No. 4,258,395 and in Gamblin et al U.S. Pat. No. 4,155,103. In both of these prior art references, the scanning is carried out by a rotating mirror while the original documents are held stationary on a transparent platen. Nodov's scanner is connected for direct control of the printer, while Gamblin et al utilizes a memory for temporary storage of the scanned information. Other prior art scanners are shown in Gunning U.S. Pat. No. 4,205,350 and in U.K. patent specification 1,531,401, both of which show the use of lasers for scanning original documents to produce scanning signals which are read into a memory. After the documents have been scanned, the stored image information is read out from memory and used to modulate the scanning laser for production of latent electrostatic images on a photoconductive surface.

All scanning systems disclosed in the above-mentioned references comprise movable optical elements which scan documents which are manually positioned on a platen. Other prior art scanning systems include automatic sheet feeding devices which carry original sheet-type documents across the viewing platen. Such systems are capable of performing manually initiated scanning of bulky documents as well as higher speed scanning of individual sheets. Typical systems of this type are disclosed in Phillips et al U.S. Pat. No. 4,043,550 and in Caldwell U.S. Pat. No. 4,043,665, both of which are used in electrostatic copiers.

Other types of prior art scanning systems known in the electrostatic copying field have a sheet scanning station which is separate from the platen utilized for copying bulky documents. Examples of scanners of this type are disclosed in Suzuki et al U.S. Pat. No. 4,158,497, Yanagawa et al U.S. Pat. No. 4,178,093 and in Knechtel U.S. Pat. No. 4,110,030. The Knechtel reference also discloses front and back side scanning of sheet-type original documents. Finally, reference is made to Kelly U.S. Pat. No. 3,844,653 which discloses front and reverse side scanning of sheet-type original documents at separate scanning stations.

Electrostatic copiers are severly constrained by the requirement of projecting an image of the original document upon a photoconductive surface once for each copy produced, and the scanners which are employed for such purposes are not entirely suitable for ink jet copying. Those scanners which have been utilized for ink jet copiers have not had automatic sheet feeding capability. Thus the prior art ink jet copiers have had extremely limited versatility and have not been able to perform many of the tasks required of a practical high speed duplicator. There has therefore been a need for an improved scanning system which is suitable for use with an ink jet copier or duplicator and which can scan a manually positioned bulky document and also feed and scan both sides of sheet-type documents.

SUMMARY OF THE INVENTION

This invention provides a document scanning system which includes a platen for scanning bulky documents, and two exposing stations for scanning two sides of sheet-type documents; the platen and the two exposing stations being positioned in a common plane. An illumination device and an array of photosensors are mounted on a carriage for movement past the platen at a uniform scanning speed and for positioning at fixed positions adjacent the two exposing stations. Sheet feeding means are provided for feeding sheet-type documents at uniform speed past the two exposing stations and inverting said documents prior to presentation to one of the exposing stations.

The coplanar positioning of the platen and the two exposing stations enables quick scanning and repositioning of the illuminator and the photosensor array as required to generate and store switching control signals for a high speed dot matrix duplicator. In preferred embodiment, the system includes a platen cover comprising a pressure pad for covering the platen and guide means for guiding sheet-type original documents along an edge registering path which extends through the platen cover and above the pressure pad. This provides a compact arrangement for automatic sheet feeding to the two exposing stations while screening the guide means for the platen. Thus it is possible to conduct closed cover platen scanning of small size sheet-type documents against an uncluttered background.

BRIEF DESCRIPTION OF THE DRAWINGS

FIG. 11 is a schematic illustration of driving mechanism for a scanner carriage assembly; and FIG. 12 is an enlarged view of a portion of FIG. 1.

DETAILED DESCRIPTION

Figure 1:
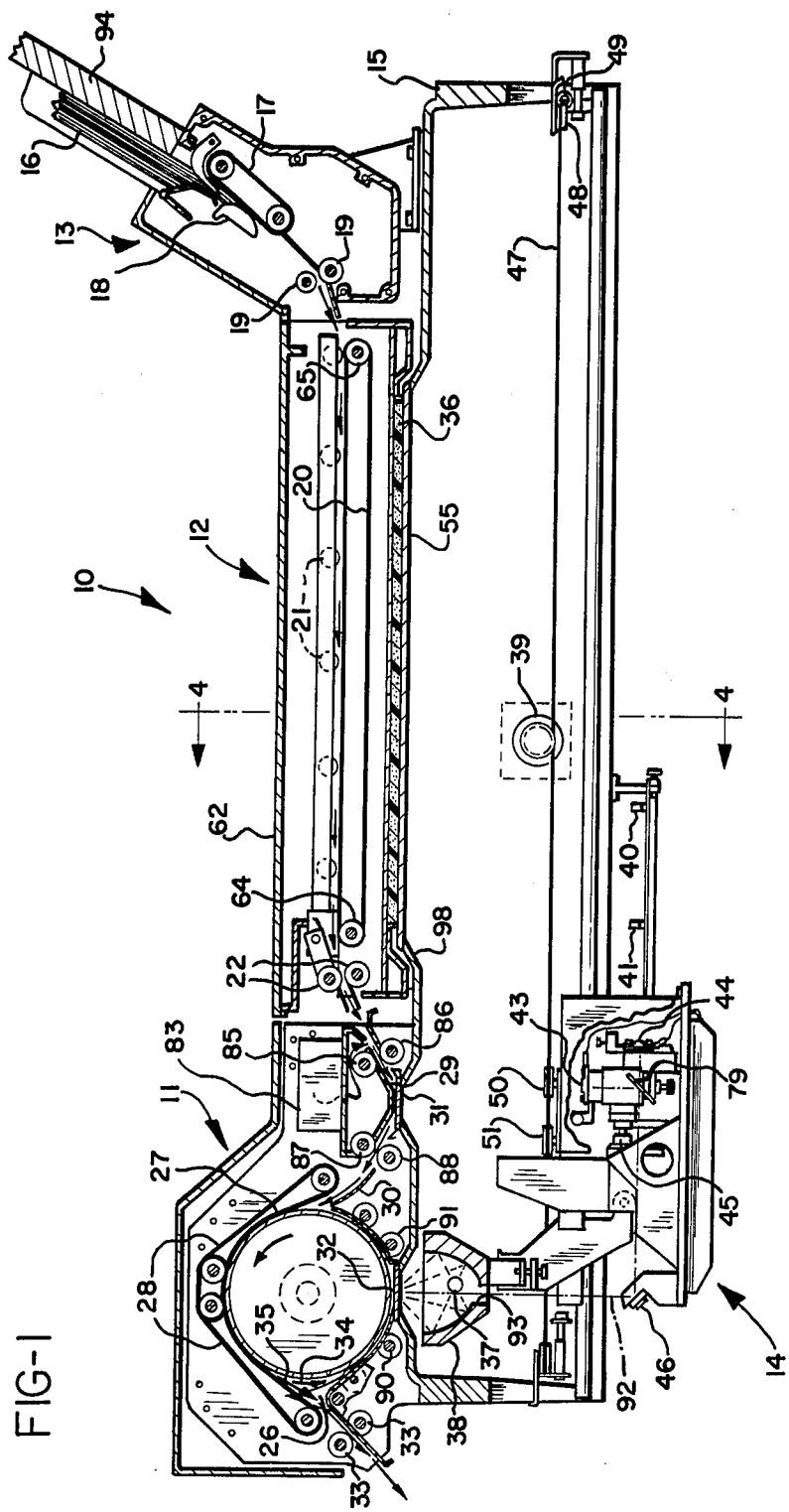
FIG. 1 is a partially sectioned side elevation view of a document scanning system according to the present invention.

A document scanning system in accordance with the present invention may be constructed as generally illustrated in FIG. 1. As illustrated in FIG. 1, a document scanning system 10 may comprise a scan station assembly 11, a platen cover 12, a document feeder assembly 13, and a scanner carriage assembly 14 all supported by a frame 15. Document exposure occurs either at a platen 55 or at a first exposure station defined by scan glass 31. In either case, scanning is performed by optical elements mounted upon scanner carriage 14.

Scan glass 31 is utilized for front side scanning of automatically fed sheet-type original documents, while platen 55 is used for exposure of either sheet-type or bulky original documents. Platen cover 12 is hinged, as hereinafter described, to accommodate exposure of bulky documents.

Document scanning system 10 also comprises a second exposure station defined by scan glass 32. The second exposure station is provided in order to accommodate reverse side scanning of automatically fed sheet-type documents, thereby providing scanning information for duplex copying. Automatic feeding of sheet-type documents is carried out as hereinafter described such that the documents pass through the second exposure station in a direction which is opposite to the direction of passage through the first exposure station.

It is a feature of this invention that scan glass 31, scan glass 32 and platen 55 are all positioned in a common plane for scanning by scanning elements carried by scanner carriage 14. The scanner elements, as hereinafter described, are adjusted for optical focusing at the common plane, and scanner carriage 14 is supported for linear motion along a path parallel to the plane so defined.

Document scanning system 10 is equipped with operator controls (not illustrated) which enable selection of either a manually initiated scanning mode (platen scanning) or an automatic document handling mode. Other controls are provided for selecting either one or two side scanning, indicating document size and entering various control commands as appropriate for operating the scanning system and controlling the associated printer. A data processing system (not illustrated) provides control commands for the document scanning system of this invention and receives the scanning information which is produced. The scanning information is processed and stored for use in generating printing control signals. Once the scanned information has been stored, it may be used for printing as many copies as may be desired.

It will therefore be seen that a document scanning system in accordance with this invention has the following four different operating modes:

Mode I—Manually initiated scanning of bulky documents (platen cover 12 raised).

Mode II—Manually initiated scanning of sheet-type original documents (platen cover 12 closed).

Mode III—Automatic feeding and single side scanning of sheet-type original documents.

Mode IV—Automatic feeding and two-side scanning of sheet-type original documents.

As illustrated in FIG. 1, document scanning system 10 is operating in above-mentioned Mode IV. Moreover, the system is illustrated during that portion of a scanning cycle when the reverse side of a sheet is being scanned. At that particular time, scanner carriage 14 is positioned such that the scanning optics are directly below scan glass 32. During Mode IV scanner carriage 14 is driven back and forth between the position illustrated in FIG. 1 and the position illustrated in FIG. 2 (scanning optics below scan glass 31), as original documents are fed serially past the two positions. For operation in Mode III, scanner carriage 14 remains fixed at the position illustrated in FIG. 2.

Figure 3:
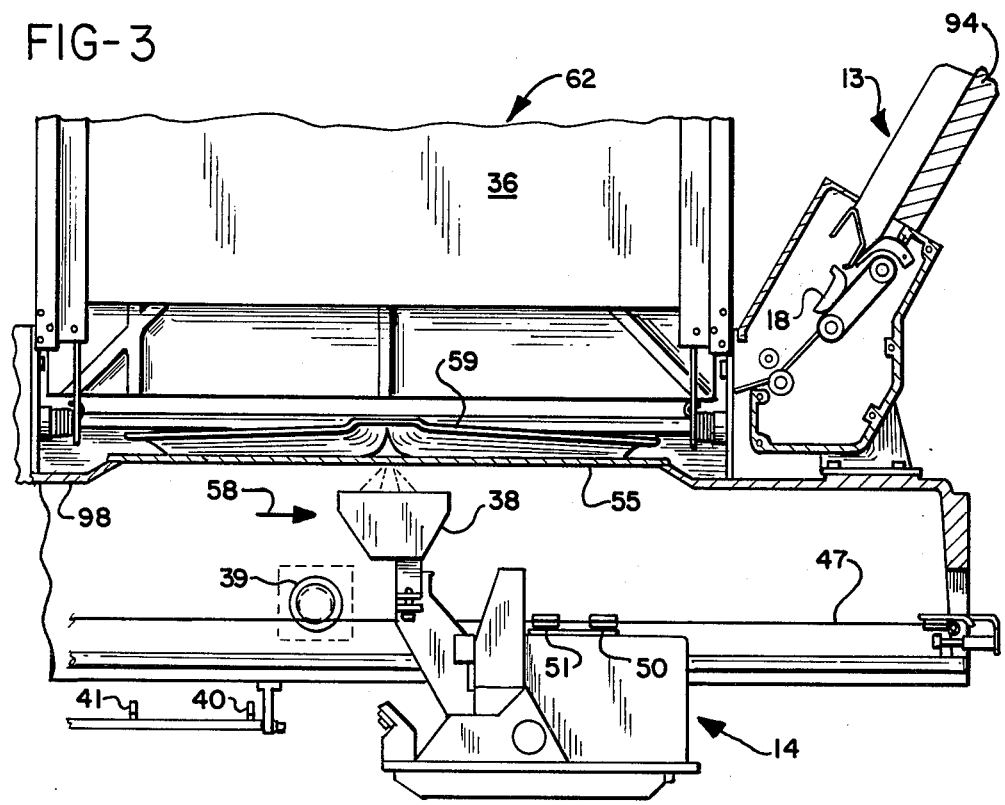
FIG. 3 illustrates the position of a scanner carriage assembly for scanning bulky original documents.

FIG. 3 illustrates the movement of scanner carriage 14 during operation in Modes I and II. The operating controls for both of these modes are identical. However, as illustrated in FIG. 3, the system may be said to be operating in Mode I, because a bulky document 59 is positioned on platen 55, and platen cover 12 is raised.

Figure 2:
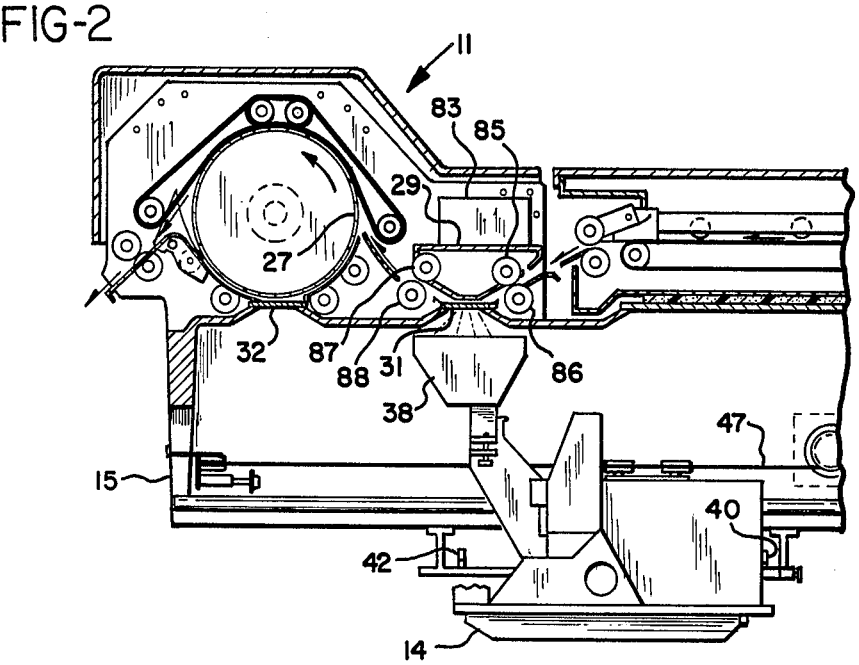
FIG. 2 illustrates the position of a scanner carriage assembly for scanning the front side of sheet-type original documents.

Document scanning system 10 is provided with three optical sensors 40, 41 and 42 as best illustrated in FIGS. 2 and 3. These sensors detect beams of light which are positioned for interruption by a flag 71 (see FIG. 4) which is carried by scanner carriage 14. Sensor 42 provides an indicating signal for the control system when scanner carriage 14 is positioned at the location illustrated in FIG. 1. Sensor 41 provides a corresponding indication when scanner carriage 14 is in the position illustrated in FIG. 2. Sensor 40 provides an indication when scanner carriage 14 is in a position known as the "home" position.

Document scanning system 10 also has a calibration strip 96 mounted against platen 55 by means of a clamp 95, as illustrated in FIG. 12. Clamp 95 may be fastened to glass support member 98 by any suitable fastening means. Calibration strip 96 may be cut from a sheet of ethylene propylene or other uniformly white material. Prior to commencement of scanning in any of Modes I through IV, scanner carriage 14 is in the "home" position. As the first step in any scanning sequence, a dark calibration reference is established by scanning with the illumination off. As the second step, illumination is commenced, and scanner carriage 14 is driven to a calibration position where the scanner is viewing calibration strip 96. At that time, the scanner is calibrated to produce output signals accurately representing the known reflectivity of calibration strip 96.

After calibration has been completed, scanner carriage 14 moves toward platen 55 (Modes I or II) or toward scan glass 31 (Modes III or IV). In the case of scanning in either of Modes I or II the document to be scanned is held stationary on platen 55 while the scanner carriage moves at a uniform speed in the direction of arrow 58 (FIG. 3).

For operation of document scanning system 10 in either of Modes III or IV, a set of sheet-type original documents are placed face down in a stack 16 upon a receiving tray 94 of feeder 13, as illustrated in FIG. 1. A high friction feed belt 17 feeds individual documents past a retard member 18. Retard member 18 has a surface which produces a frictional drag force against sheets being pulled therepast by feed belt 17. This frictional drg force is lower than the driving force produced by feed belt 17 but higher than inter sheet coupling forces. This effectively prevents multiple feeds, so that individual documents are fed through the nip between rollers 19.

Figure 5:
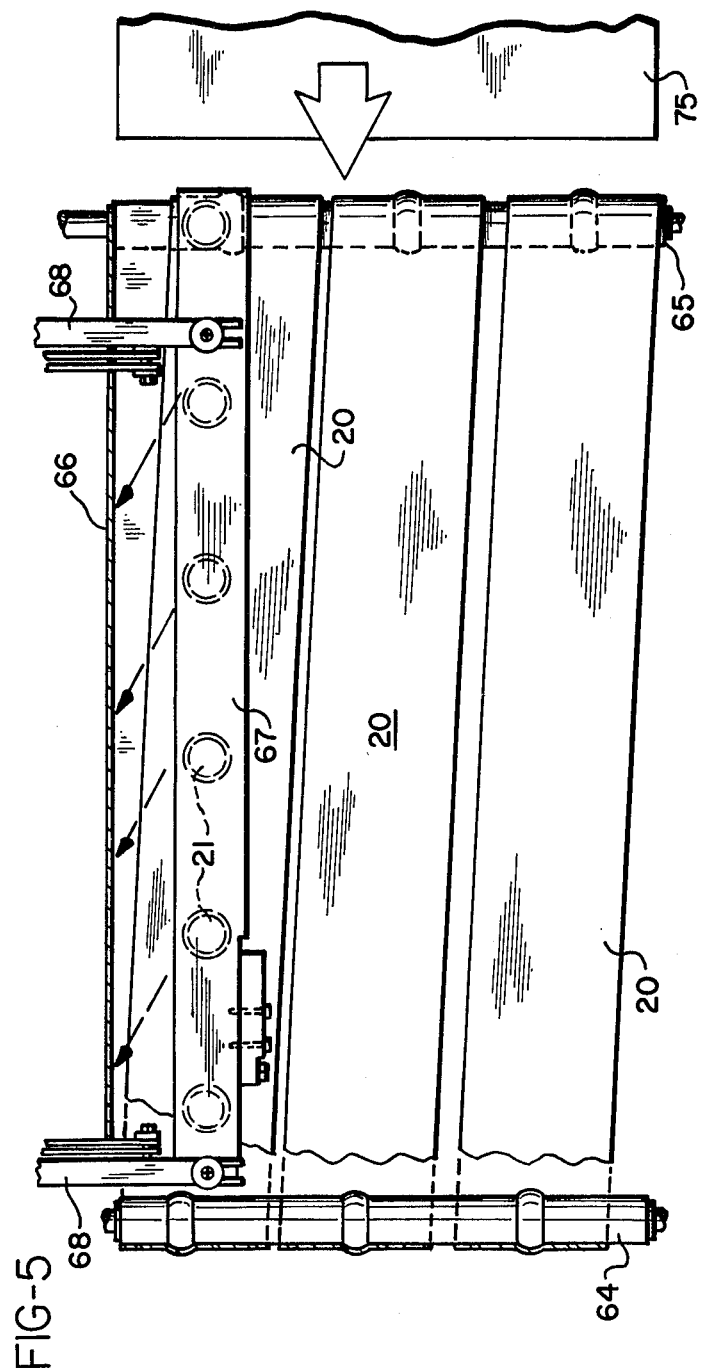
FIG. 5 illustrates transport belts for guiding sheet-type original documents through a platen cover.

After passage between rollers 19, the sheet-type documents are received by a series of belts 20 which are mounted inside platen cover 12, as best illustrated in FIG. 5. Belts 20 are angularly mounted on rollers 64 and 65 for receiving a document 75 and transporting it forwardly toward rollers 22 and sidewardly toward registration guide 66. This provides accurate side registration of the documents prior to scanning at scan glass 31.

Platen cover 12 also comprises a series of hold-down balls 21 mounted in a ball cage 67. Hold-down balls 21 urge document 75 downwardly against transport belts 20 without inhibiting sideward movement toward registration guide 66.

Figure 7:
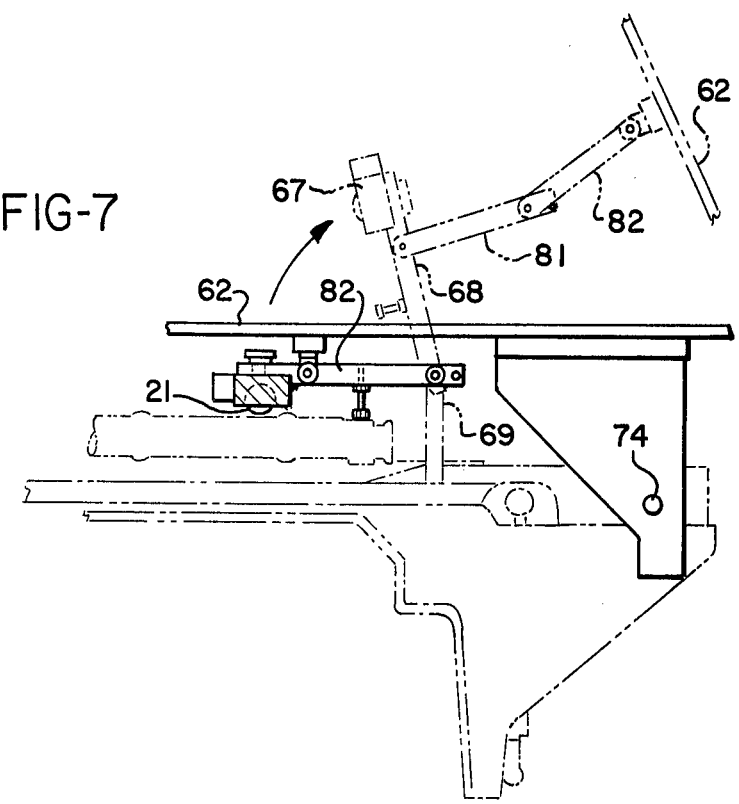
FIG. 7 is a schematic illustration of the hinging movement of a lid for a platen.

Ball cage 67 is carried by a pair of arms 68, each of which is pivotally supported by a support post 69. There is a lid 62 which covers platen cover 12 and which can be raised upwardly about a hinge line 74 after releasing a latch 63. Ball cage lift arm 68 is connected to lid 62 by links 81 and 82 as illustrated in FIG. 7. This provides access to the inside of platen cover 12 for clearance of any paper jam which might occur.

Figure 6:
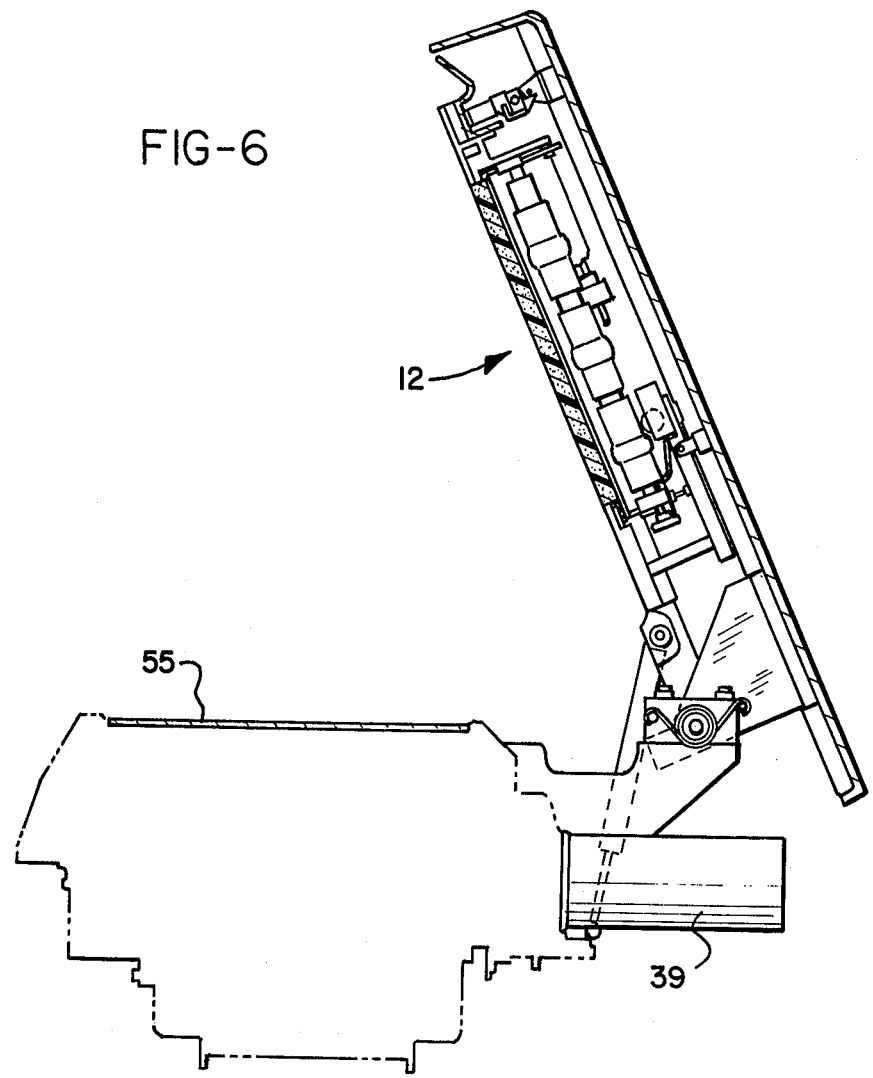
FIG. 6 is a partially sectioned end elevation view illustrating a raised platen cover.

For copying of bulky documents, platen cover 12 may be raised as illustrated in FIG. 6. Lifting of platen cover 12 is facilitated by a weight counterbalancing gas spring 60. Additional counterbalancing is provided by a torsion spring 61 which is mounted about hinge line 74 and connected to lid 62.

For operation in scanning Mode II, it is desirable that a clean, reflective background be provided. Thus platen cover 12 includes a pressure pad 36 which conveniently may comprise a white polyurethane elastomer sheet bonded to a resilient polyurethane foam material. The white elastomeric sheet provides the desired reflective background, so that small size sheet-type original documents may be copied without production of a cluttered or unsightly background. It will be noted that transport belts 20 are positioned for guiding sheet-type original documents between lid 62 and pressure pad 36 when platen cover 12 is lowered and document scanning system 10 is engaged in automatic document handling in either of scanning Modes III or IV.

Figure 9:
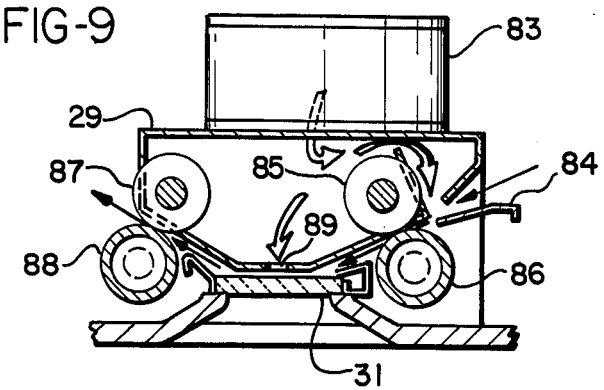
FIG. 9 is a schematic illustration of transport means for presenting the front side of a sheet-type document to an exposing station.

The description of the preferred embodiment will not continue with a description of scan station assembly 11, which receives sheet-type documents such as documents 75 from rollers 22 of platen cover 12. Documents 75 are received by rollers 85 and 86 are delivered into a narrow gap between the lower surface of a plenum chamber 29 and the upper surface of scan glass 31. Passage of the documents through this gap is assisted by flowing air as generally illustrated in FIG. 9. A fan mounted within fan box 83 provides a flow of air into plenum chamber 29 for outward pressure around roller 85 toward a guide member 84. Roller 85 is a segmented roller, so that the flowing air is carried into the nip between roller 85 and roller 86. This flow of air progresses toward scan glass 31, where it joins other air provided directly from the interior of plenum chamber 29 via an opening 89. Thereafter, the combined air flow carries documents 75 through the nip between rollers 87 and 88. Roller 87 is also segmented to provide a path for the flowing air.

After pressure through the first exposing station, as above described, documents 75 are delivered to drum 27 for transportation either to the second exposing station defined by scan glass 32 or to a pair of exit rollers 33, depending upon whether two-side or one-side scanning is desired. Documents 75 are guided toward drum 27 by guide member 30 and are gripped against the drum by a set of cooperating guide belts 28. Drum 27 is driven by mechanism (not shown), and guide belts idle with motion of drum 27. Drum 27 is preferably covered by a white elastomeric sleeve 78 (see FIG. 10).

Figure 10:
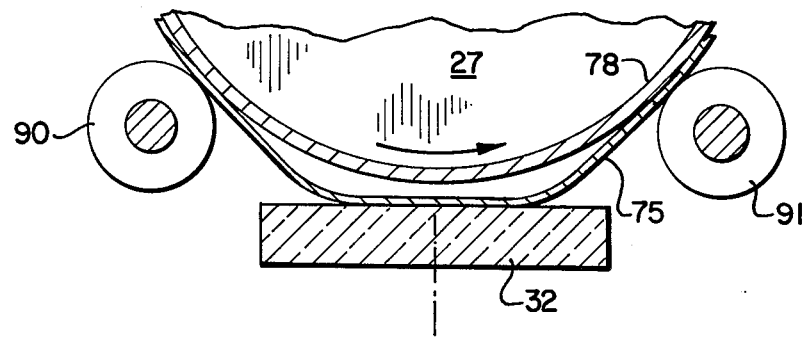
FIG. 10 is a schematic illustration of the presentation of the reverse side of a sheet-type document to an exposing station.

Scan station assembly 11 includes a movable gate 26 which may be positioned against drum 27 or opened to the position illustrated in FIG. 1. When gate 26 is in the opened position, documents 75 follow the path indicated by arrow 34. This causes the documents to follow drum 27 around to scan glass 32 for exposure as illustrated in FIG. 10. It will be noted that documents 75 approach scan glass 32 in an inverted position. That is, the side of each document which is presented to scan glass 32 is opposite the side previously presented to scan glass 31. Furthermore, the document moves in opposite directions during the two exposures, so there is no top-to-bottom reversal of the scanning data. There is, however, a left-to-right image reversal, which is readily accommodated by the data handling system.

Referring now to the exaggerated sketch of FIG. 10, it will be seen that documents 75 pass between drum 27 and roller 90 enroute to scan glass 32. After passing roller 90, documents 75 tend to bulge outwardly away from drum 27 for flattening against scan glass 32. This enables sharp focussed scanning by the scanning optics. Preferably, drum 27 is positioned so as to provide a gap of about 0.75 milimeters between its covering sleeve 78 and scan glass 32.

After passage past scan glass 32, the leading edges of the documents are caught by roller 91 and carried back into contact with drum 27. Then the documents are carried upwardly until they reach belts 28 for a second time. Thereafter, the system controller closes gate 26 against drum 27. Gate 26 then strips the document 75 away from drum 27 for movement in the direction indicated by arrow 35. This directs the document toward exit rollers 33.

Preferred scanning optics for use in the practice of this invention comprise a line source illuminator 37 and a reflector 38, as illustrated in FIG. 1. The inside surface of reflector 38 defines a setion of an elliptical cylinder, and illumination lamp 37 is positioned along one focal line of the elliptical cylinder. Scanner carriage 14 transports reflector 38 along a path with respect to the common plane of scan glass 31, scan glass 32 and platen 55 such that the second focal line of the elliptical cylinder coincides with the common plane. This causes a bright line of illumination to be focussed upon the surface of the document being scanned at any point along the common plane. An image of that portion of a document which is so illuminated is reflected backwardly along an optical path 92 which extends through an opening 93 in the rear of reflector 38.

Figure 8:
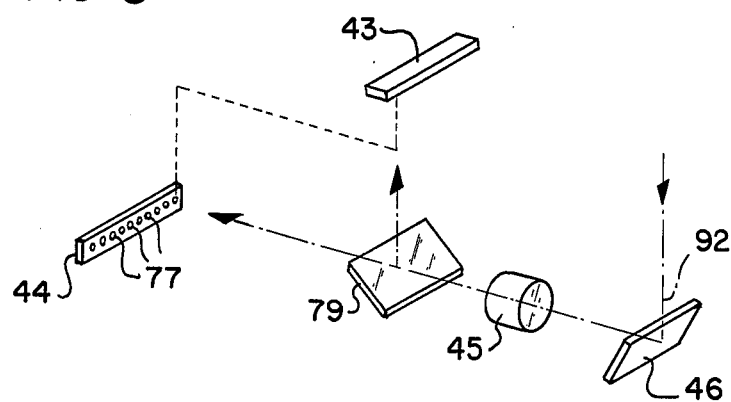
FIG. 8 is a schematic illustration of the positioning of a pair of CCD arrays.

After passage through opening 93, optical path 92 proceeds toward a pair of CCD arrays 43 and 44, as best illustrated in FIG. 8. The path toward the CCD arrays 43 and 44 carries the reflected light downwardly for reflection off the surface of a folding mirror 46 and then through a lens 45. The light then proceeds toward a beam splitter 79, which directs half of the light along a path toward CCD array 43 and half of the light along another path toward CCD array 44. CCD arrays 43 and 44 each comprise a series of charge coupled photodetectors 77 of conventional design. For example, arrays 43 and 44 may be Fairchild CCD 143 arrays. These arrays, while readily available on the commercial market, are not sufficiently long for scanning the entire width of one of documents 75. This length deficiency may be accommodated by utilizing a pair of such arrays, as illustrated in FIG. 8. The two arrays are optically butted together, so that the last photodetector 77 of CCD array 43 is optically positioned adjacent the first photodetector 77 of CCD array 44. If desired, CCD arrays 43 and 44 may be positioned with a few overlapping photodetectors 77, and redundant scanning information may be discarded.

The driving mechanism for scanner carriage 14 is illustrated in FIG. 11 and comprises a drive motor 39, a drive pulley 54, a drive cable 47, idler pulleys 50 through 53, a snubber 48 and a tension spring 49. Idler pulleys 52 and 53 are supported by frame 15, while idler pulleys 50 and 51 are supported by scanner carriage 14. Drive pulley 54 may have a helical groove for receiving and driving drive cable 47. Alternatively, drive pulley 54 may have a smooth surface and be provided with flanges at both ends. One end of drive cable 47 is secured to frame 15, while the other end of cable 47 is secured to spring 49. Spring 49 is secured to frame 15 so as to maintain tension in cable 47 and to accommodate variations in the length thereof. Snubber 48 maintains tension in cable 47 during acceleration and deceleration of scanner carriage 14. The drive arrangement produces linear movement of scanner carriage 14 at a velocity equal to one-half the linear movement velocity of cable 47 around drive pulley 54.

Figure 4:
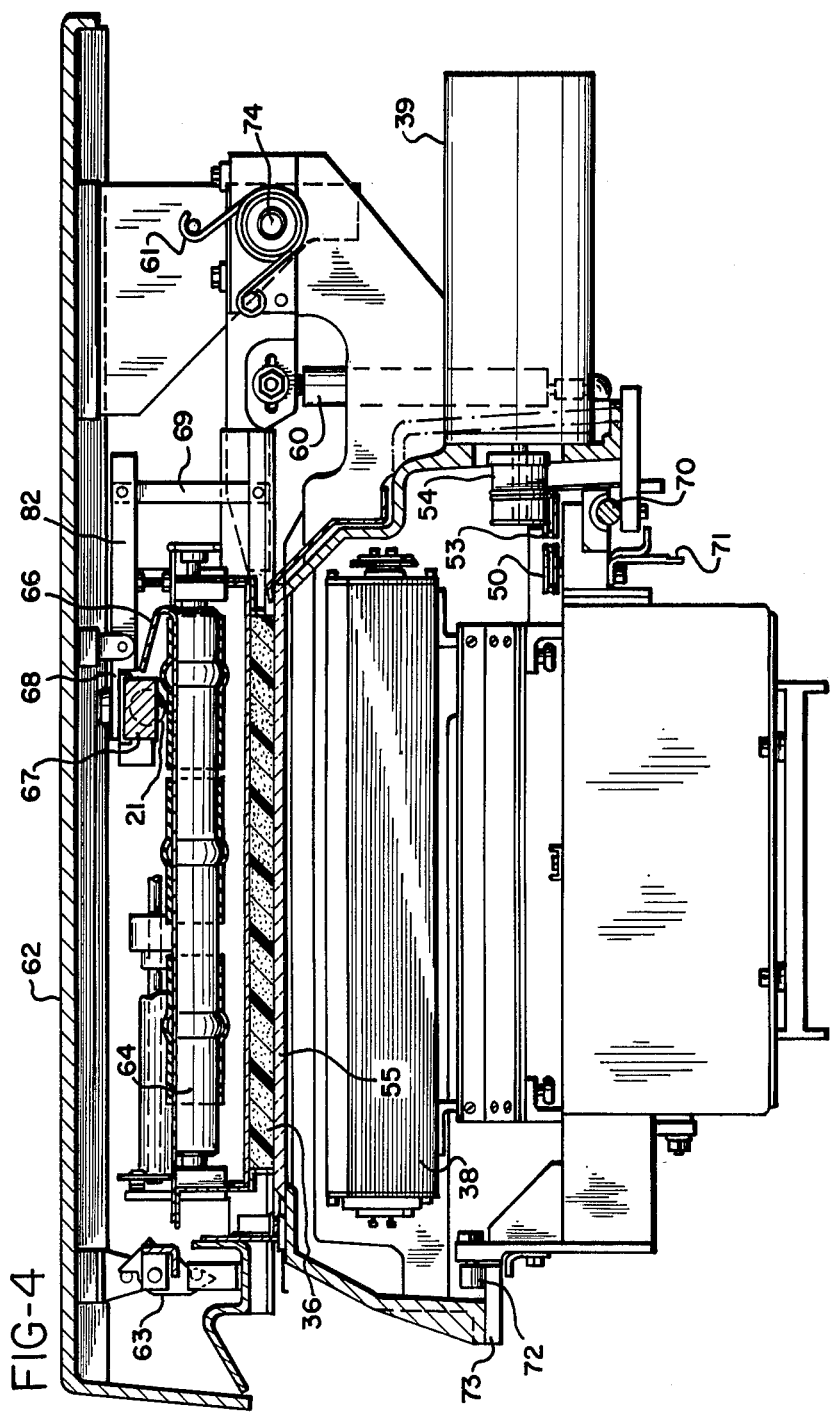
FIG. 4 is a view taken along lines 4—4 of FIG. 1.

During its linear driving movement as above described, scanner carriage 14 is supported by a guide rail 70 and a ledge 73 (FIG. 4). Scanner carriage 14 maintains a sliding contact with guide rail 70. A support roller 72 is provided for rolling contact with ledge 73.

While the method herein described, and the form of apparatus for carrying this method into effect, constitute preferred embodiments of the invention, it is to be understood that the invention is not limited to this precise method and form of apparatus, and that changes may be made in either without departing from the scope of the invention.

What is claimed is:

1. Document scanning apparatus comprising:
   document illumination means including a lamp and a reflector,
   an array of photosensors for sensing light generated by said illumination means and reflected from a document to be scanned,
   a platen for supporting and exposing bulky original documents held stationary thereupon,
   a first exposing station for exposing the front sides of moving sheet-type original documents transported therepast, said first exposing station being located in a common plane with said platen but displaced therefrom,
   a second exposing station for exposing the reverse sides of moving sheet-type original documents transported therepast, said second exposing station being displaced from both of said platen and said first exposing station but being located within the common plane thereof,
   carriage means for moving said document illumination means and said array of photosensors in a direction parallel to said common plane, said movement moving said document illumination means and said array of photosensors at a uniform scanning speed past said platen and to fixed positions adjacent said first and second exposing stations,
   first transport means for transporting original sheet-type documents at a uniform speed past said first exposing station, and
   second transport means for receiving original sheet-type documents from said first transport means, presenting the reverse sides of said documents to said second exposing station, and transporting said documents at uniform speed past said second exposing station.

2. Apparatus according to claim 1 wherein said second transport means carry said sheet-type documents past said second exposing station in a direction opposite to the direction of movement of said documents past said first exposing station.

3. Apparatus according to claim 2 wherein said second transport means comprises:
   a drum positioned adjacent said second exposing station,
   means for mounting said sheet-type documents upon said drum,
   means for rotating said drum to carry said sheet-type documents past said second exposing station, and
   selectively actuatable stripper means for stripping said sheets from said drum after one full rotation therewith.

4. Apparatus according to any of claims 1-3 wherein said first exposing station is positioned between said platen and said second exposing station.

5. Apparatus according to claim 4 and further comprising a document feeder for receiving a supply of sheet-type original documents and feeding said documents one at a time to said first transport means; said document feeder being positioned alongside said platen opposite said first exposing station.

6. Apparatus according to claim 5 and further comprising a hinged cover for said platen; and cover comprising:
   a pressure pad for covering said platen,
   a lid for covering said cover, and
   guide means for receiving sheet-type documents from said document feeder, guiding said documents through said cover along a path between said pressure pad and said lid, aligning the edges of said documents during movement along said path, and delivering said documents to said first transport means.

7. Apparatus according to any of claims 1-3 and further comprising:
   a frame for supporting said platen, said first and second exposing stations, and said first and second transport means,
   a guide rail mounted on said frame for guiding the movement of said carriage means,
   a drive cable supported by said frame and connected to said carriage means, and
   cable drive means supported by said frame for driving said drive cable and causing linear movement of said carriage means.

8. Apparatus according to any of claims 1-3 wherein said reflector comprises a section of an elliptical cylinder, said reflector being mounted on said carriage means such that one focal line of said elliptical cylinder coincides with said common plane, and said lamp comprises a line source illuminator positioned at the other focal line of said elliptical cylinder.

9. Method of scanning a series of sheet-type original documents comprising the steps of:
   (1) placing said sheets on a receiving tray,
   (2) removing said sheets from said receiving tray one-by-one and transporting said sheets forwardly at uniform speed through a first exposing station,
   (3) exposing each said sheet to an electro-optical scanner during passage through said first exposing station,
   (4) inverting said sheets and directing them at uniform speed through a second scanning station in a direction reverse to the direction of passage through said first exposing station, said second exposing station being coplanar with the plane of passage of said sheets through said first scanning station, (5) exposing each said sheet to said electro-optical scanner during passage through said second exposing station, (6) moving said electro-optical scanner back and forth between said first scanning station and said second scanning station for scanning both sides of all of said sheets, and (7) transporting said sheets forwardly to a receiving tray.

10. Method according to claim 9 and further comprising the step of exposing a calibration strip to said electro-optical scanner.

* * * * *